(12) United States Patent
Dowe et al.

(10) Patent No.: US 9,551,441 B2
(45) Date of Patent: Jan. 24, 2017

(54) MULTILAYER PIPE WITH POLYAMIDE LAYER

(71) Applicants: Andreas Dowe, Borken (DE); Juergen Franosch, Marl (DE); Jan Berger, Dortmund (DE); Claudia Behrens, Herdecke (DE)

(72) Inventors: Andreas Dowe, Borken (DE); Juergen Franosch, Marl (DE); Jan Berger, Dortmund (DE); Claudia Behrens, Herdecke (DE)

(73) Assignee: EVONIK DEGUSSA GmbH, Essen (DE)

( * ) Notice: Subject to any disclaimer, the term of this patent is extended or adjusted under 35 U.S.C. 154(b) by 234 days.

(21) Appl. No.: 14/225,842

(22) Filed: Mar. 26, 2014

(65) Prior Publication Data

US 2014/0290782 A1    Oct. 2, 2014

(30) Foreign Application Priority Data

Mar. 28, 2013    (DE) .................. 10 2013 205 616

(51) Int. Cl.
| | | |
|---|---|---|
| F16L 9/14 | (2006.01) |
| B32B 27/32 | (2006.01) |
| B32B 27/34 | (2006.01) |
| B32B 1/08 | (2006.01) |
| B32B 15/08 | (2006.01) |

(52) U.S. Cl.
CPC . F16L 9/14 (2013.01); B32B 1/08 (2013.01); B32B 15/08 (2013.01); B32B 27/32 (2013.01); B32B 27/34 (2013.01); B32B 2597/00 (2013.01)

(58) Field of Classification Search
USPC .................. 138/141, 143, 146; 428/36.91
See application file for complete search history.

(56) References Cited

U.S. PATENT DOCUMENTS

| | | | |
|---|---|---|---|
| 5,026,763 A * | 6/1991 | Lohrbaecher ........... C08L 77/00 524/495 |
| 5,152,323 A * | 10/1992 | Shotts ..................... B21C 37/09 138/143 |
| 5,505,851 A * | 4/1996 | Wagener ................ B01D 71/56 210/490 |
| 5,520,223 A * | 5/1996 | Iorio ..................... B29C 63/486 138/137 |
| 6,293,311 B1 * | 9/2001 | Bushi .................. B29C 47/0023 138/138 |
| 6,455,118 B1 | 9/2002 | Dewimille et al. |
| 8,574,697 B2 | 11/2013 | Dowe et al. |
| 8,815,363 B2 * | 8/2014 | Smillie ................. B32B 27/308 428/36.9 |
| 2001/0026854 A1 * | 10/2001 | Usui ..................... B29C 47/0052 428/36.91 |
| 2002/0005223 A1 * | 1/2002 | Campagna .............. F16L 9/147 138/146 |
| 2002/0185188 A1 * | 12/2002 | Quigley ..................... B32B 1/08 138/137 |
| 2003/0064316 A1 * | 4/2003 | Zebala ................. B01J 19/0046 430/270.1 |
| 2004/0040609 A1 * | 3/2004 | Oishi ....................... B32B 1/08 138/141 |
| 2010/0009106 A1 | 1/2010 | Dowe et al. |
| 2011/0165358 A1 | 7/2011 | Dowe et al. |
| 2011/0209768 A1 | 9/2011 | Dowe et al. |
| 2012/0006465 A1 | 1/2012 | Dowe et al. |
| 2012/0041100 A1 * | 2/2012 | Oh ......................... C08G 69/04 523/351 |
| 2012/0199317 A1 | 8/2012 | Hartmann et al. |
| 2012/0275774 A1 | 11/2012 | Goering et al. |
| 2012/0279577 A1 | 11/2012 | Goering et al. |
| 2013/0025734 A1 | 1/2013 | Kuhmann et al. |
| 2013/0025735 A1 | 1/2013 | Kuhmann et al. |
| 2013/0032239 A1 | 2/2013 | Kuhmann et al. |
| 2013/0032240 A1 | 2/2013 | Kuhmann et al. |
| 2013/0171388 A1 | 7/2013 | Pawlik et al. |
| 2013/0263961 A1 * | 10/2013 | Ahn ........................ F16L 9/147 138/143 |

FOREIGN PATENT DOCUMENTS

| | | | |
|---|---|---|---|
| WO | WO 2011/128175 A1 | 10/2011 |
| WO | WO 2011/128197 A1 | 10/2011 |

OTHER PUBLICATIONS

European Search Report issued on Jul. 16, 2014 in the corresponding European Application No. 14157844.3.

* cited by examiner

*Primary Examiner* — James Hook
(74) *Attorney, Agent, or Firm* — Oblon, McClelland, Maier & Neustadt, L.L.P.

(57) ABSTRACT

A pipe or pipeline for use in the oil and gas industry for conveying lines, collection pipelines and transport pipelines with reduced operating risk and increased lifetime is provided. The pipe contains: a) an external reinforcement layer and b) an internal liner which comprises securely bonded to one another: I) a layer made of a thermoplastic molding composition selected from a polyolefin molding composition and a fluoropolymer molding composition and II) a layer made of a polyamide molding composition, wherein not only the polyamide molding composition but also the molding composition of the layer according to I) in essence comprises no blend component which is composed of another polymer and which has disperse distribution in the molding composition.

15 Claims, 1 Drawing Sheet

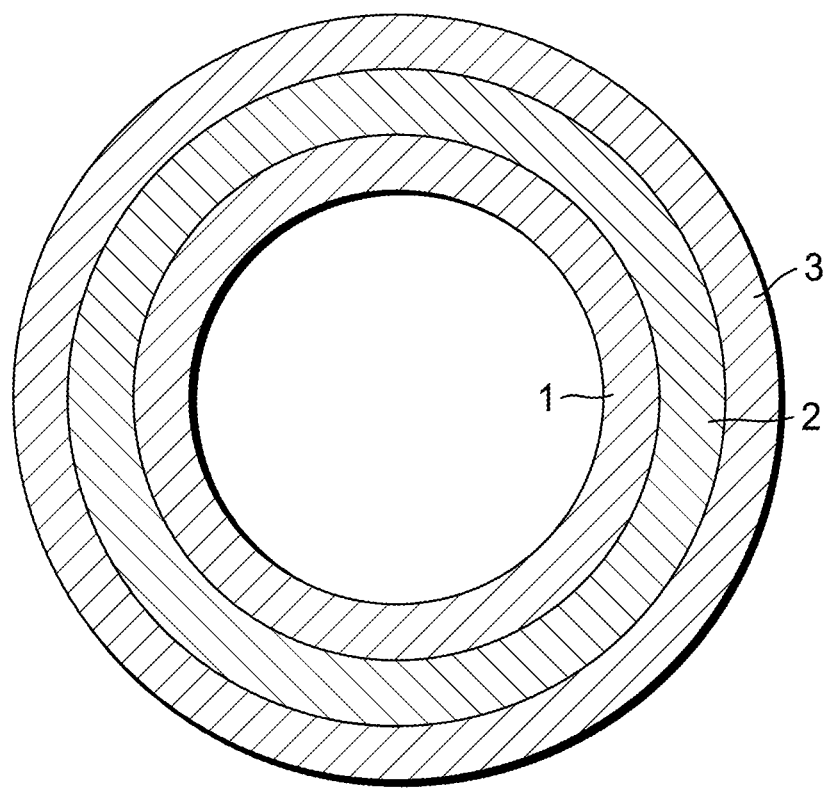

MULTILAYER PIPE WITH POLYAMIDE LAYER

CROSS REFERENCE TO RELATED APPLICATIONS

This application claims priority to German Application No. 102013205616.8, filed Mar. 28, 2013, the disclosure of which is incorporated herein by reference in its entirety.

BACKGROUND OF THE INVENTION

The invention relates to pipes which comprise an exterior reinforcement layer and an internal multilayer liner which comprises a polyamide layer and a functional layer made of another polymer. These pipes are in particular used for the conveying or transport of crude oil or natural gas or for the transport of supercritical $CO_2$ especially under conditions where relatively rapid pressure changes are likely to occur. Pressure changes of this type are a phenomenon known in the oil and gas industry as "Rapid Gas Decompression" (RGD).

Methods of handling such pressure changes are therefore required in, for example, tertiary mineral oil production. Tertiary oil production uses supercritical $CO_2$ as solvent for residual oil, reducing its viscosity and facilitating extraction from the oil-bearing strata. The critical temperature for $CO_2$ is 31° C., the critical pressure being 73.8 bar. In practice, markedly higher pressures are used, since the solvent power of supercritical $CO_2$ increases with pressure. Typical pressures are in the range from 75 to 220 bar, and the temperature under these conditions can be up to 150° C.

The pipes which transport supercritical $CO_2$ often have a polymeric inliner in order to protect the usually metallic structure from corrosion. In the case of transport pipes, the liner is usually composed of polyethylene; however, it can also be composed of polyamide or of PVDF.

Rapid pressure changes can moreover occur during the operation of crude-oil pipelines and gas pipelines, for example, when the pipeline is depressurized for maintenance operations, with a sudden pressure decrease. A sudden pressure decrease can also occur in such conveying lines, collection pipelines or transport pipelines in the event of an emergency shutdown.

Inliners made of polyethylene exhibit severe swelling in contact with crude oil or natural gas, in particular at the pressures and temperatures used, and this leads to undesired changes in length. This phenomenon can be mitigated if there is a polyamide layer protecting the polyethylene layer on the inside, i.e. on the side facing towards the fluid conveyed. At higher usage temperatures, polyamide is often used as inliner material; it is preferable that this layer is protectively covered on the inside by a polyolefin layer, a fluoropolymer layer or a combination of polyolefin layer and fluoropolymer layer, in order that the polyamide, which is susceptible to hydrolysis at relatively high temperatures, is protected from the water present in the fluid conveyed.

Flexible pipes of multilayer structure with unbonded layers are described in WO 2011/128175 and WO 2011/128197. The pipes described in those documents comprise an inner liner in the form of a multilayer pipe, where the individual layers of said multilayer pipe do not necessarily have adhesive bonding to one another. These pipes can comprise, on the inside of the inner liner, a reinforcement which is usually termed carcase, in order to prevent collapse of the inner liner under high external pressure.

Particularly in the cases where the pipe does not comprise any carcase, it is important that the individual layers of the liner adhere securely to one another. If there is no adhesion, a gas-filled annular space forms between the layers during operation. The gas pressure of the annular space is in equilibrium with the partial pressure of the gas in the conveyed fluid. In the event of pressure variations in the pipeline, the gas located in the annular space can expand; in the worst case, the gas of the annular space can assume a volume which can lead to radial contact between parts of the interior layer of the liner. This leads to blockage of the cross section of the pipe and, in the worst case, prevents any further passage of the fluid conveyed. This type of failure is known to the person skilled in the art as collapse and is the predominant type of failure of inliners. If the gas volume accumulated between the layers is large, the forces arising on expansion of the gas due to pressure reduction in the pipe can also cause collapse of an internal carcase. This type of failure is known to be fatal in the pipes concerned.

However, secure layer adhesion is not a sufficient precondition for preventing collapse of the inner liner layer. It has been found in practice that in many cases where there is initially secure adhesion between a polyamide layer and a polyolefin layer or fluoropolymer layer the adhesion becomes progressively weaker during operation, and the layers finally separate, and the innermost layer can collapse if pressure within the pipe falls.

The object of the invention was to provide a pipe which has exterior reinforcement layer and multilayer liner, and in which a polyamide layer and a polyolefin layer or fluoropolymer layer adhere securely to one another, and in which this secure adhesion is in essence retained during operation.

SUMMARY OF THE INVENTION

Surprisingly, it has been found that adhesion is lost during operation if the moulding composition of any of the layers comprises a blend component made of another polymer dispersed in the moulding composition and thus forming its own disperse phase in the matrix.

Thus, the object of the invention and others have been achieved by the present invention, the first embodiment of which includes a pipe, which comprises the following layers:

a) an external reinforcement layer and b) an internal liner which comprises the following layers securely bonded to one another:

I. a layer made of a thermoplastic moulding composition selected from a polyolefin moulding composition and a fluoropolymer moulding composition and II. a layer made of a polyamide moulding composition, where not only the polyamide moulding composition but also the moulding composition of the layer according to I. in essence comprises no blend component which is composed of another polymer and which has disperse distribution in the moulding composition. This means that the amount of any blend component of this type present in the polyamide moulding composition is less than 2% by weight, preferably less than 1.5% by weight, particularly preferably less than 1% by weight, with particular preference less than 0.5% by weight and very particularly preferably zero.

BRIEF DESCRIPTION OF THE DRAWINGS

FIG. 1 shows a schematic drawing of the pipe according to an embodiment of the invention.

DESCRIPTION OF THE PREFERRED EMBODIMENTS

Throughout this description all ranges described include all values and sub-ranges therein, unless otherwise specified. Additionally, the indefinite article "a" or "an" carries the meaning of "one or more" throughout the description, unless otherwise specified.

The first embodiment of the present invention provides a pipe, comprising:
a) an external reinforcement layer and
b) an internal liner which comprises:
I. a layer of a thermoplastic moulding composition selected from a polyolefin moulding composition and a fluoropolymer moulding composition and
II. a layer of a polyamide moulding composition,
wherein the layers I and II are securely bonded to one another, and
neither layer I nor layer II in essence comprises a blend component which is composed of a polymer different from the polymer of the layer and which has disperse distribution in the moulding composition of the layer.

FIG. 1 shows a schematic arrangement of the elements of the pipe, wherein layer 1 is the inner layer of the internal liner, layer 2 is the layer of the polyamide composition and 3 is the external reinforcement layer.

According to the present invention the term "in essence" means that the amount of any blend component of this type present in the polyamide moulding composition is less than 2% by weight, preferably less than 1.5% by weight, particularly preferably less than 1% by weight, with particular preference less than 0.5% by weight and very particularly preferably zero.

Examples of such blend components which are in essence not permitted to be present in the moulding compositions concerned are impact modifiers, for example, the polyolefinic impact modifiers very frequently used for example of EPM type, EPDM type or SEBS type, polyolefins such as polyethylene or polypropylene, fluoropolymers, acrylonitrile-butadiene-styrene polymers (ABS), where, when the polymers mentioned are used in a polyamide moulding composition in practice they comprise reactive functional groups such as carboxylic anhydride groups; another example being acrylic rubber or other types of polyamide that are incompatible with the polyamide matrix. These polymers are conventionally known and there is therefore no need here for any more detailed description. The same also applies in general terms for other polymers not listed by name here which would have disperse distribution in the moulding composition concerned.

The form in which blend components of this type are present in the moulding composition depends on the conditions of production and processing and may be, for example spherical, ellipsoid, fibrous or laminar. The precise morphology is unimportant; all of these morphologies are detrimental and according to the invention must be avoided.

The morphology of a polymer blend may be determined by scanning electron microscopy (SEM) or transmission electron microscopy (TEM) in the manner conventionally known to the person skilled in the art. Since the vast majority of polymers are incompatible with one another, this is not generally necessary according to the invention. The person skilled in the art knows that the polymers mentioned above have disperse distribution in the polyamide, polyolefin or fluoropolymer when a blend of this type is produced. The usual method of producing a blend is mixing in the melt.

Blend components which are not dispersed in the moulding composition but instead are dissolved therein are permitted according to the invention. It is known that PA1012 and PA1212 are homogeneously miscible with PA12. The addition of such polyamides to a PA12 moulding composition is therefore not critical. The same applies to polyamide elastomers such as polyetheresteramides and polyetheramides; these are composed of hard polyamide blocks and of soft polyether blocks. The latter form a separate disperse phase within the blend, but have secure bonding to the hard polyamide blocks which, given a suitable hard block length, are in solution in the polyamide matrix, as long as the polyamide of the hard blocks is identical or at least miscible with the matrix polyamide. According to the invention, therefore, the only blend components that are not permitted to be present are those that would in essence be in dispersed form. This means that at least 85 percent by volume of said blend component or at least 90 percent by volume or entirely all of said blend component has disperse distribution in the polyamide matrix.

The polyamide that may be used according to the invention may be produced from a combination of diamine and dicarboxylic acid, from an ω-aminocarboxylic acid or from the corresponding lactam. In principle, any polyamide may be used, for example PA46, PA6, PA66 or copolyamides on this basis with units deriving from terephthalic acid and/or from isophthalic acid. In one preferred embodiment, the monomer units comprise on average at least 8, at least 9 or at least 10 C atoms. In mixtures of lactams it is the arithmetic average that is considered here. In the case of a combination of diamine and dicarboxylic acid, the arithmetic average of the C atoms of diamine and dicarboxylic acid in this preferred embodiment must be at least 8, at least 9 or at least 10. Examples of suitable polyamides are: PA610 (which can be produced from hexamethylenediamine [6 C atoms] and sebacic acid [10 C atoms], the average number of C atoms in the monomer units here therefore being 8), PA88 (produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. Semiaromatic polyamides moreover have good suitability, for example PA66/6T, PA6/6T, PA6T/MPMDT (MPMD meaning 2-methylpentamethylenediamine), PA9T, PA10T, PA11T, PA12T, PA14T and copolycondensates of these latter types with an aliphatic diamine and with an aliphatic dicarboxylic acid or with an ω-aminocarboxylic acid or with a lactam. The production of the polyamides is conventionally known. It may also be possible, of course, to use copolyamides based thereon, and it is also optionally possible here to make concomitant use of monomers such as caprolactam.

The polyamide may also be a polyetheresteramide or a polyetheramide. Polyetheramides are described in DE-A 30 06 961. They comprise a polyetherdiamine as comonomer. Suitable polyetherdiamines may be obtained through conversion of the corresponding polyetherdiols by reductive amination or coupling to acrylonitrile with subsequent hydrogenation (e.g. EP-A-0 434 244; EP-A-0 296 852). Their number-average molecular weight is generally from 230 to 4000; their polyetheramide content is preferably from 5 to 50% by weight.

Commercially available polyetherdiamines based on propylene glycol are obtainable commercially as Elastamin® grades from Huntsman. Other materials also having good suitability in principle are polyetherdiamines based on 1,4-butanediol or 1,3-butanediol, or mixed-structure polyetherdiamines, for example with random or with blockwise distribution of the units deriving from the diols.

It is also possible to use mixtures of various polyamides, with the precondition of sufficient compatibility. Compatible polyamide combinations are known to the person skilled in the art or may be determined by routine experimentation.

One possible embodiment according to the present invention uses a mixture of from 30 to 99% by weight, more particularly from 40 to 98% by weight and with particular preference from 50 to 96% by weight, of polyamide in the narrow sense and from 1 to 70% by weight, particularly preferably from 2 to 60% by weight and with particular preference from 4 to 50% by weight, of polyetheresteramide and/or polyetheramide. Preference may be given here to polyetheramides.

It is preferable that the polyamide used comprises substantial content of terminal amino groups, and it is particularly preferable here that at least 50% of the terminal groups are composed of amino groups. The polyamide preferably has at least 15 meq/kg of amino groups, particularly preferably at least 20 meq/kg, with particular preference at least 25 meq/kg and very particularly preferably at least 30 meq/kg, at least 35 meq/kg, at least 40 meq/kg, at least 45 meq/kg or at least 50 meq/kg. The upper limit of amino group content is determined by the molecular weight of the polyamide and by the nature and amount of any polyamines incorporated, which can function as branching agents. The concentration of amino groups may generally be at most 400 meq/kg.

The polyamide moulding composition can comprise other components, examples being plasticizers, stabilizers, processing aids, pigments, chain extenders and the like. Polyamide content is at least 60% by weight, preferably at least 70% by weight, particularly preferably at least 80% by weight and with particular preference at least 90% by weight.

The polyolefin moulding composition of the layer according to b) I comprises a polyolefin which may primarily be a polyethylene, in particular a high-density polyethylene (HDPE), or an isotactic or syndiotactic polypropylene. The polyethylene may preferably be crosslinked, usually either by way of reaction with free-radical initiators or by way of moisture-initiated crosslinking of grafted-on silyl groups. The polypropylene may be a homo- or copolymer, for example, with ethylene or 1-butene as comonomer. The polyolefin moulding composition may comprise the usual auxiliaries and additives. Polyolefin content here is at least 60% by weight, preferably at least 70% by weight, particularly preferably at least 80% by weight and with particular preference at least 90% by weight.

In order to achieve the necessary layer adhesion, the polyolefin may be functionalized with polar groups, for example, anhydride groups or epoxy groups. The moulding composition may also be a mixture of a functionalized and an unfunctionalized polyolefin. If an entirely unfunctionalized polyolefin is used, the required adhesion may be achieved by using an adhesion promoter between the polyamide layer and the polyolefin layer; this adhesion-promoter layer may be thin. Suitable adhesion promoters are obtainable commercially; they are usually polyolefins functionalized with a reactive compound, e.g. maleic anhydride, acrylic acid or glycidyl methacrylate. Multilayer composites with good layer adhesion made of a polyamide layer, a polyolefin layer, the polyolefin of which has optionally been functionalized, and also optionally of an adhesion promoter are conventionally known to the person skilled in the art as described for example in WO 2006/010736.

The fluoropolymer used for the layer according to b) I. may be, for example, a polyvinylidene fluoride (PVDF), an ethylene-tetrafluoroethylene copolymer (ETFE), an ETFE modified with the aid of a tercomponent such as propene, hexafluoropropene, vinyl fluoride or vinylidene fluoride (an example being EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoro(alkyl vinyl) ether copolymer (PFA). These polymers are known to a person skilled in the art and are available commercially in a wide variety of grades. PVDF is usually used as homopolymer, but the PVDF used may also comprise copolymers based on vinylidene fluoride which have up to 40% by weight of other monomers. Examples that may be mentioned of these other monomers are: trifluoroethylene, chlorotrifluoroethylene, ethylene, propene and hexafluoropropene. The fluoropolymer moulding composition may comprise the usual auxiliaries and additives. The content of fluoropolymer here may be at least 60% by weight, preferably at least 70% by weight, particularly preferably at least 80% by weight and with particular preference at least 90% by weight.

In order to achieve the necessary layer adhesion with respect to the polyamide layer, the fluoropolymer may be adhesion-modified. There are various possible methods for this. For example, the fluoropolymer may be functionalized by free-radical reaction with a reactive compound such as maleic anhydride, aconitic anhydride, itaconic anhydride or acrylic acid. It may also be possible to use free-radical initiators which comprise functional groups such as carbonate groups, during the production of the fluoropolymer; this then comprises a terminal functional group (EP 0 992 518 A1). In another possible method, the unfunctionalized fluoropolymer, for example a PVDF, may be mixed with an added polymer that is compatible therewith and that comprises functional groups, for example a polyglutarimide or an acrylate copolymer, which therefore binds to the polyamide of the adjacent layer (EP 0 637 511 A1). In an alternative method, the required adhesion may be achieved by using an adhesion promoter between the polyamide layer and the fluoropolymer layer; the adhesion-promoter layer may be thin. An example of a suitable adhesion promoter is an adhesion-modified fluoropolymer described above.

According to the invention, the layers according to b) I. and b) II. have secure bonding to one another. This means that the adhesion between said layers is preferably at least 1.0 N/mm, particularly preferably at least 2.0 N/mm and with particular preference at least 3.0 N/mm. The maximum adhesion value is determined in that above said value cohesive failure occurs, i.e. the separation takes place within one of the layers. Adhesion may be determined as separation force by a separation test according to DIN 53357 in a tensile tester with a test velocity of 50 mm/min.

According to the invention, the term "pipe" means a transportable section; this section can certainly also be a long section if the flexibility of the pipe is sufficient to allow same to be rolled up for transport. A plurality of such pipes are generally joined to give a pipeline. The invention also provides a pipeline which comprises a pipe of the invention.

In one embodiment, the external reinforcement layer of the pipe may be a compact metal pipe. It is preferably composed of stainless or other steel, of copper, of aluminium, of cast iron, of galvanized steel, of cadmium-plated steel, of aluminium-coated metal, of steel coated with metal alloys, e.g. with GALFAN, or of any other metal. It may be particularly preferable that the inner surface of the pipe is composed of steel, of zinc or of an alloy with the main constituent aluminium, iron or zinc.

The internal multilayer liner is introduced in the form of a multilayer pipe into the reinforcement composed of the compact metal pipe described above. There are generally two possible introduction variants.

In the first variant, the external diameter of the multilayer pipe, here and hereinafter termed inliner, is slightly greater than the internal diameter of the reinforcement, in this case the compact metal pipe or the pipeline ("close-fit design"). The difference between the two diameters is at least an infinitesimally small value. The external diameter of the inliner is typically at most 25% and preferably at most 15% greater than the internal diameter of the pipe or of the pipeline. Prior to introduction, the cross section of the inliner is generally reduced by at least 3%, preferably by at least 5%, particularly preferably by at least 10%, with particular preference by at least 15% and very particularly preferably by at least 20%. This can be achieved by way of example by stretching, compression or folding according to conventionally known methods.

Suitable methods for the introduction of an oversized inliner into a pipe or a pipeline are described in the following Patent Applications: EP 0 562 706 A2, EP 0 619 451 A1, WO 95/27168, WO 98/02293, WO 01/16520, EP 0 377 486 A2, EP 0 450 975 A2, EP 0 514 142 A2 and WO 96/37725.

After the introduction of the inliner, this comes into contact with the internal wall of the pipe by virtue of the recovery process. Said process can be assisted by application of pressure and heat. The pipe thus lined has no annular space. However, there may be very small residual volumes due to irregularities of the interior surface of the pipe or of the pipeline which may be present because of surface roughness or else because of welds.

In the second variant, the external diameter of the inliner corresponds to the internal diameter of the compact metal pipe or pipeline or is slightly smaller (to an extent of about 2 to at most 10%), and the inliner may therefore be introduced into the pipeline by using small forces ("loose fit design"). It may also be possible, if necessary, to reduce the cross section of the inliner by exposure to an exterior force prior to introduction of same; however, this force can be markedly smaller than in the first embodiment. The respective pipe geometries are selected in such a way that on exposure to the temperature change the polymeric inliner undergoes greater radial thermal expansion than the pipe or the pipeline, and establishes close contact here, with generation of the necessary application pressure. The latter can be increased by applying an internal pressure, for example, with compressed air. The operating pressure prevailing during operation moreover ensures that the inliner maintains contact with the pipeline.

This embodiment may have the disadvantage that conveyed gases can permeate through the inliner. Gas therefore enters the cavities and/or microcavities between the inliner and the metal pipe. The gas pressure in this situation may be in equilibrium with the partial pressure of the gas in the conveyed fluid. In the event of pressure variations in the pipeline, the gas located in the cavities may expand; in the worst case, the gas may assume a volume which can lead to radial contact between parts of the liner. This leads to blockage of the cross section of the carrier pipe and, in the worst case, prevents any further passage of the fluid conveyed. This type of failure is known to the person skilled in the art as collapse and is the predominant type of failure of inliners. Care must be taken here to minimize the residual cavity. This may preferably be achieved by using the close-fit design, thus minimizing the residual cavity between inliner and reinforcement layer. In the ideal case, the residual volume is so greatly reduced that when pressure variations cause the permeated gas to expand it cannot assume the volume required for collapse of the inliner.

Possible collapse of the inliner may be eliminated, moreover, by adhesive bonding. If the reinforcement of the pipe or of the pipeline is heated to a temperature above the softening range or melting range of the material of the exterior surface of the inliner, the external surface of the inliner melts and the pressure applied, generated either by the recovery process, by the thermal expansion of the inliner or by an internal pressure applied externally, causes the melt to be forced into the microcavities between the inliner and the pipe or the pipeline. No permeating gas can then accumulate and no collapse of the inliner can then occur in the event of variation in the pressure of the conveyed fluid. The reinforcement can be brought to the appropriate temperature prior to, during or else after the introduction of the inliner.

After the adhesive bonding, the temperature is reduced. The pipe may be cooled naturally, preferably by using an air lock and particularly preferably by using water cooling.

After cooling, a long-lasting interlocking effect is present between the inliner material and the reinforcement layer, sometimes with additional adhesive bonding. This may also have the effect of preventing relative movement between inliner and reinforcement.

In one embodiment of this process, an adhesion promoter may also be applied to the internal layer of the reinforcement of the pipe or pipeline, an example being an epoxy resin coating, and optionally another adhesive layer. The functional groups of said adhesion promoter are available for chemical reaction with functional groups of the inliner material. These may be the terminal groups of a polyamide or else the anhydride groups of a functional polyolefin.

In another embodiment, the pipe is described as an "unbonded flexible pipe." Unbonded flexible pipes are conventionally known and comprise an inner liner in the form of a plastic pipe as barrier to the escape of the conveyed fluid, and one or more reinforcement layers on the external side of said inner liner. The unbonded flexible pipe may comprise additional layers, for example, one or more reinforcement layers on the internal side of the inner liner, in order to prevent collapse of the inner liner under high external pressure. This type of interior reinforcement is usually termed carcase. There may moreover be exterior sheathing present in order to provide a barrier to ingress of liquid from the exterior environment into the reinforcement layers or other internal polymeric or metallic functional layers.

Typical unbonded flexible pipes are described in WO 01/61232, U.S. Pat. No. 6,123,114 and U.S. Pat. No. 6,085,799; they are moreover described in more detail in API Recommended Practice 17B, "Recommended Practice for Flexible Pipe", 3rd edition, March 2002 and in API Specification 17J, "Specification for Unbonded Flexible Pipe", 2nd edition, November 1999.

The term "unbonded" means in this context that at least two of the layers, inclusive of reinforcing layers and plastics layers, have not been designed to have bonding to one another. In practice, the pipe comprises at least two reinforcement layers which, over the entire length of the pipe, have no bonding to one another either directly or indirectly, i.e. by way of other layers. Bending of the pipe thus becomes possible and it has sufficient flexibility to be rolled up for transport purposes.

These unbonded flexible pipes are used in various embodiments in offshore applications and in various onshore applications for the transport of liquids, gases and slurries. They may be used for the transport of fluids where very high water pressure or large differences in water pressure are present along the length of the pipe, an example of an embodiment being risers which run from the sea bed up to equipment at or in the vicinity of the surface of the sea, another embodiment being in general terms pipes for the transport of liquids or gases between various items of equipment, and pipes laid at great depth on the sea bed, or pipes between items of equipment in the vicinity of the surface of the sea.

In these flexible pipes, the reinforcement layer(s) is/are composed of helically arranged steel wires, steel profiles or steel tapes, where the individual layers can have different winding angles relative to the axis of the pipe. There are generally at least two external reinforcement layers present, the structure of at least one of these being such that it withstands the internal pressure, and the structure of at least one of these being such that it withstands tensile forces.

In another embodiment, the external reinforcement layer is composed of fibres, for example of glass fibres, for example in the form of fibre bundles or woven fibres, and/or of metal wire, where these have been embedded into a polymeric matrix, where the pipe may comprise a plurality of such reinforcement layers. There need not be any bonding between these reinforcement layers. It may be preferable that the exterior surface of the inliner and the inner surface of the reinforcement layer that then follows are adhesive-bonded or welded to one another.

According to the present invention, the internal diameter of the inner liner may generally be at least 30 mm, at least 40 mm, at least 50 mm or at least 60 mm, and at most 900 mm, at most 800 mm, at most 700 mm or at most 620 mm; however, in individual cases it can also be higher or lower. The overall wall thickness of the inner liner may generally be at least 2 mm, at least 2.5 mm, at least 3 mm, at least 4 mm or at least 5 mm and at most 50 mm, at most 40 mm, at most 30 mm, at most 25 mm, at most 20 mm, or at most 16 mm; again, in individual cases it can be higher or lower. The thickness of individual layers depends on the performance requirements.

In one possible variant, the inner liner comprises an internal fluoropolymer layer and an external polyamide layer, where either the moulding composition of the fluoropolymer layer is adhesion-modified or the fluoropolymer layer and the polyamide layer are bonded to one another via an adhesion-promoter layer. Examples of applications include crude-oil conveying pipelines such as Flexible Pipes or Steel Catenary Risers (SCR), gas pipelines and crude-oil-transport and crude-oil-collection lines. In comparison with an inner liner, composed only of a polyamide layer, there is the advantage here of increased resistance to temperature change and to chemicals and in particular improved hydrolysis resistance. This type of liner is less expensive than a fluoropolymer-monolayer liner.

In another possible variant, the inner liner comprises an internal polyolefin layer and an external polyamide layer, where either the moulding composition of the polyolefin layer is adhesion-modified or the polyolefin layer and the polyamide layer are bonded to one another via an adhesion-promoter layer. Examples of applications are the same as those for the first-mentioned variant; the polyolefin layer of this variant acts mainly as barrier layer with respect to water.

In another possible variant, the inner liner comprises an internal polyamide layer and an external polyolefin layer, where either the moulding composition of the polyolefin layer is adhesion-modified or the polyolefin layer and the polyamide layer are bonded to one another via an adhesion-promoter layer. Examples of applications are the same as those for the abovementioned variants. Advantages may include reduced swelling of the polyolefin layer and therefore in a possible increase of operating temperature; there may also be a cost advantage in comparison with a polyamide-monolayer liner.

The pipes and pipelines of the invention are subject to less operating risk and exhibit increased lifetime.

Having generally described the invention in the above text, a better understanding may be obtained from the following examples which are not intended to be limiting unless specifically so designated.

EXAMPLES

The following moulding compositions were used in the examples:

PA12 without modification: an extrusion-grade PA12 with relative viscosity $\eta_{rel}$ 2.21, measured in m-cresol according to DIN EN ISO 307, having 55 meq/kg of terminal amino groups and 10 meq/kg of terminal carboxy groups. The moulding composition also comprised standard stabilizers.

Impact-modified PA12 moulding composition: comprised not only the abovementioned grade of PA12 and the standard stabilizers but also 5% by weight of Exxelor® VA1803, a maleic-anhydride-functionalized ethylene-propylene rubber.

Adherent PVDF: blend of 94.5% by weight of PVDF and 5.5% by weight of polyglutarimide corresponding to EP 0 637 511 A1. The polyglutarimide in essence formed an amorphous mixed phase together with the amorphous fraction of the PVDF.

The pipes were produced by coextrusion with temperatures of 260° C. at the head and at the die and with a take-off velocity of 2 m/min. They were then cut into pieces, in order to obtain test specimens.

The test specimens were subjected to four cycles of compression and decompression in a high-pressure autoclave, the parameters used here being as follows:
first saturation period 24 h; pressure 450 bar
cycle period: at least 24 h
decompression rate about 120 to 140 bar/min
temperature 90° C.
storage time between two cycles: 1 h
gas: $CO_2$ (supercritical, saturated with water)
Table 1 gives the results.

TABLE 1

Inventive Example 1 and Comparative Example 1

| | | Layer adhesion in N/mm (separation test according to DIN 53 357) | | | | | |
|---|---|---|---|---|---|---|---|
| | | along extrusion direction | | | | around circumference | |
| Pipe dimensions 32 × 3 mm | | untreated | | after 4 cycles of RGD test at 90° C./450 bar/$CO_2$ | | | |
| External layer of pipe: thickness 1 mm | Internal layer of pipe: thickness 2 mm | minimal | average value | minimal | average value | minimal | average value |
| PA12 without modification (Inventive Example 1) | adherent PVDF | 4.5 | 5.8 | 13.6 | 14.7 | 11.2 | 19.2 |

TABLE 1-continued

Inventive Example 1 and Comparative Example 1

| | | Layer adhesion in N/mm (separation test according to DIN 53 357) | | | | | |
|---|---|---|---|---|---|---|---|
| | | along extrusion direction | | | | around circumference | |
| Pipe dimensions 32 × 3 mm | | untreated | | after 4 cycles of RGD test at 90° C./450 bar/$CO_2$ | | | |
| External layer of pipe: thickness 1 mm | Internal layer of pipe: thickness 2 mm | minimal | average value | minimal | average value | minimal | average value |
| Impact-modified PA12 moulding composition (Comparative Example 1) | adherent PVDF | 8.1 | 8.4 | 0.6 | 3.2 | 1.4 | 5.1 |

Various modifications of the invention as described may be made as recognized by one of skill in the art. Such modification is intended to be within the scope of the invention as recited in the following Claims.

The invention claimed is:

1. A pipe, comprising:
a) an external reinforcement layer and
b) an internal liner which comprises:
I. a layer of a thermoplastic moulding composition selected from a polyolefin moulding composition and a fluoropolymer moulding composition and
II. a layer of a polyimide moulding composition,
wherein
the layers I and II are securely and directly adhered to one another,
each of the layers I and II have a polymer composition comprising only homogeneously miscible polymers, and
adhesion between the layers I and II is at least 1.0 N/mm, determined according to DIN 53357.

2. The pipe according to claim 1, wherein the external reinforcement layer is a metal pipe.

3. The pipe according to claim 2, wherein the liner is adhesive-bonded to the metal pipe.

4. The pipe according to claim 1, wherein the pipe is an unbonded flexible pipe having an external reinforcement layer comprising helically arranged steel wires, steel profiles or steel tapes.

5. The pipe according to claim 4,
wherein the external reinforcement layer comprises at least two external layers,
wherein at least one external layer has a structure that withstands the internal pressure, and at least one external layer has a structure that withstands tensile forces.

6. The pipe according to claim 4, wherein
the external reinforcement layer further comprises an exterior sheathing in the form of a pipe or hose made of a thermoplastic moulding composition or of an elastomer.

7. The pipe according to claim 1, wherein
the external reinforcement layer comprises at least one layer having fibres and/or wire embedded into a polymeric matrix.

8. The pipe according to claim 7, wherein
an exterior surface of the inner liner is adhesive-bonded or welded to an inner surface of the external reinforcement layer.

9. The pipe according to claim 1, wherein the inner liner comprises:
an internal fluoropolymer layer; and
an external polyamide layer;
wherein the moulding composition of the fluoropolymer layer is adhesion-modified or the fluoropolymer layer and the polyamide layer are bonded to one another by an adhesion-promoter layer.

10. The pipe according to claim 1, wherein the inner liner comprises:
an internal polyolefin layer; and
an external polyamide layer;
wherein the moulding composition of the polyolefin layer is adhesion-modified or the polyolefin layer and the polyamide layer are bonded to one another by an adhesion-promoter layer.

11. The pipe according to claim 1, wherein the inner liner comprises:
an internal polyamide layer; and
an external polyolefin layer;
wherein the moulding composition of the polyolefin layer is adhesion-modified or the polyolefin layer and the polyamide layer are bonded to one another by an adhesion-promoter layer.

12. The pipe according to claim 1, wherein the polyamide of the polyamide moulding composition comprises amino groups and a content of the amino groups is at least 15 meq/kg of the polyamide.

13. A pipeline which comprises the pipe according to claim 1.

14. The pipeline according to claim 13, which is a conveying pipeline, a collection pipeline or a transport pipeline for crude oil or natural gas.

15. The pipeline according to claim 13, which is a pipeline for supercritical $CO_2$.

* * * * *

UNITED STATES PATENT AND TRADEMARK OFFICE
CERTIFICATE OF CORRECTION

PATENT NO. : 9,551,441 B2
APPLICATION NO. : 14/225842
DATED : January 24, 2017
INVENTOR(S) : Andreas Dowe et al.

It is certified that error appears in the above-identified patent and that said Letters Patent is hereby corrected as shown below:

In the Claims

Column 11, Line 27, delete "polyimide" and insert -- polyamide --, therefore.

Signed and Sealed this
Fifth Day of May, 2020

Andrei Iancu
*Director of the United States Patent and Trademark Office*